United States Patent
Lim

(10) Patent No.: US 10,091,346 B2
(45) Date of Patent: Oct. 2, 2018

(54) APPARATUS AND METHOD FOR STORING DATA OF PERIPHERAL DEVICE IN PORTABLE TERMINAL

(75) Inventor: Hun Lim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 13/470,062

(22) Filed: May 11, 2012

(65) Prior Publication Data

US 2012/0290942 A1    Nov. 15, 2012

(30) Foreign Application Priority Data

May 13, 2011    (KR) .......................... 10-2011-0044866

(51) Int. Cl.
*H04M 1/725* (2006.01)
*H04L 12/28* (2006.01)

(52) U.S. Cl.
CPC ...... *H04M 1/72533* (2013.01); *H04L 12/282* (2013.01); *H04L 12/2812* (2013.01); *H04M 1/7253* (2013.01); *H04L 2012/2849* (2013.01); *H04M 1/72558* (2013.01); *H04M 2250/64* (2013.01)

(58) Field of Classification Search
CPC .......... G06F 13/14; G06F 3/048; G06F 15/16; G06F 12/10; G06F 13/00; H04M 1/274516; H04M 1/72527; H04M 1/7253; H04M 1/72533; H04M 1/72558; H04M 2250/64; H04L 12/2812; H04L 12/282; H04L 2012/2849

USPC .......................................................... 715/748
See application file for complete search history.

(56) References Cited

U.S. PATENT DOCUMENTS 8,055,362 B2 * 11/2011 Yamada .................. G06F 21/10
                                                        700/94
8,244,179 B2    8/2012 Dud
(Continued)

FOREIGN PATENT DOCUMENTS

CN            1577299        2/2005
CN          101529437        9/2009
(Continued)

OTHER PUBLICATIONS

Rouse, Margaret. Definition: placeshifting. Entry posted at whatis. com. Last updated Aug. 2005. Retrieved from [http://whatis.techtarget.com/definition/placeshifting] on [May 14, 2017]. 4 pages.*

(Continued)

*Primary Examiner* — Amy M Levy

(57) ABSTRACT

An apparatus and method for playing data, played in a device connected with a portable terminal, in another device are provided. An apparatus for storing data of a peripheral device in a portable terminal includes a user interface (UI) managing unit and a data processing unit. The UI managing unit is configured to display, in the event of connection with a peripheral device, a UI for controlling data played in the peripheral device. The data processing unit is configured to copy the played data of the peripheral device through the UI and display a list of the copied data. The data processing unit is further configured to transmit data selected from the displayed list to another device.

7 Claims, 8 Drawing Sheets

(56) References Cited

U.S. PATENT DOCUMENTS

| | | | |
|---|---|---|---|
| 8,453,057 B2* | 5/2013 | Stallings | G06F 3/0483 715/726 |
| 8,683,335 B2* | 3/2014 | Shirai | G06F 17/30772 707/E17.001 |
| 8,713,607 B2* | 4/2014 | McEnroe | H04N 7/163 725/41 |
| 2002/0002413 A1* | 1/2002 | Tokue | G06F 21/10 700/94 |
| 2002/0136405 A1* | 9/2002 | Hori | G06F 21/10 380/203 |
| 2002/0186662 A1* | 12/2002 | Tomassetti | H04N 21/439 370/254 |
| 2002/0188762 A1* | 12/2002 | Tomassetti | H04L 12/2803 709/251 |
| 2004/0015708 A1* | 1/2004 | Obayashi | G06F 8/65 713/189 |
| 2004/0031058 A1* | 2/2004 | Reisman | G06F 17/30873 725/112 |
| 2004/0098533 A1* | 5/2004 | Henshaw | G06F 12/0866 711/100 |
| 2004/0225746 A1* | 11/2004 | Niell | H04W 4/00 709/231 |
| 2005/0003761 A1* | 1/2005 | Chandley | 455/41.3 |
| 2005/0010964 A1* | 1/2005 | Sano | G11B 27/034 725/134 |
| 2005/0055716 A1* | 3/2005 | Louie | G06F 1/1632 725/58 |
| 2005/0203976 A1* | 9/2005 | Hyun | G06F 17/30215 |
| 2005/0273473 A1* | 12/2005 | Grace | H04L 67/1095 |
| 2006/0004948 A1* | 1/2006 | Grace | H04L 67/1095 711/100 |
| 2006/0085577 A1* | 4/2006 | Takashima | G11B 19/02 710/62 |
| 2006/0095471 A1* | 5/2006 | Krikorian | H04N 21/4398 |
| 2006/0161635 A1* | 7/2006 | Lamkin | G06F 17/30041 709/217 |
| 2006/0168651 A1* | 7/2006 | Araki | G06Q 10/107 726/6 |
| 2006/0179306 A1* | 8/2006 | Kikkoji | H04N 7/17318 713/168 |
| 2006/0190559 A1 | 8/2006 | Lim | |
| 2006/0242259 A1* | 10/2006 | Vallabh et al. | 709/217 |
| 2006/0253782 A1* | 11/2006 | Stark | G06F 17/30053 715/727 |
| 2006/0253874 A1* | 11/2006 | Stark | G06F 3/038 725/62 |
| 2006/0258289 A1* | 11/2006 | Dua | 455/41.3 |
| 2006/0293964 A1* | 12/2006 | Akihata | G06F 21/10 705/26.1 |
| 2007/0038771 A1* | 2/2007 | Julia | H04N 1/00137 709/231 |
| 2007/0078948 A1* | 4/2007 | Julia | G06F 17/30017 709/217 |
| 2007/0079095 A1* | 4/2007 | Hanley | G06F 21/10 711/163 |
| 2007/0089174 A1* | 4/2007 | Bader | G06F 21/10 726/32 |
| 2007/0147230 A1* | 6/2007 | Yasuda | H04N 1/00291 370/214 |
| 2007/0162941 A1* | 7/2007 | Bennett | H04N 5/4403 725/81 |
| 2007/0168543 A1* | 7/2007 | Krikorian | G11B 27/034 709/231 |
| 2007/0186180 A1* | 8/2007 | Morgan | H04N 5/44543 715/779 |
| 2007/0207755 A1* | 9/2007 | Julia | H04N 1/00127 455/217 |
| 2007/0288596 A1* | 12/2007 | Sindoni | H04M 19/04 709/217 |
| 2008/0125067 A1* | 5/2008 | Bells | H04W 4/00 455/187.1 |
| 2008/0165141 A1* | 7/2008 | Christie | 345/173 |
| 2008/0172451 A1* | 7/2008 | Kim | H04L 29/06027 709/203 |
| 2008/0188966 A1* | 8/2008 | Sutardja | G06F 17/30061 700/94 |
| 2008/0250163 A1* | 10/2008 | Oh | G11B 19/02 710/12 |
| 2008/0279533 A1* | 11/2008 | Buttars | H04L 63/061 386/252 |
| 2009/0019240 A1* | 1/2009 | Kawasaki | G06F 17/30017 711/154 |
| 2009/0030971 A1* | 1/2009 | Trivedi | G06F 3/0486 709/203 |
| 2009/0106666 A1* | 4/2009 | Nomura | G06F 17/30126 715/748 |
| 2009/0201377 A1 | 8/2009 | Okano | |
| 2009/0254727 A1* | 10/2009 | Hashimoto | G11B 20/10527 711/165 |
| 2010/0049825 A1 | 2/2010 | Todoroki | |
| 2010/0119208 A1* | 5/2010 | Davis | H04N 5/765 386/291 |
| 2010/0131613 A1* | 5/2010 | Jonsson | H04L 12/281 709/218 |
| 2010/0149096 A1* | 6/2010 | Migos | G06F 3/04883 345/158 |
| 2010/0165217 A1* | 7/2010 | Jacob | H04N 5/4403 348/734 |
| 2010/0259464 A1 | 10/2010 | Chang et al. | |
| 2011/0069844 A1* | 3/2011 | Krampf | H03J 1/0025 381/58 |
| 2011/0088002 A1* | 4/2011 | Freer | G06F 3/017 715/863 |
| 2011/0105041 A1* | 5/2011 | Maruyama | G08C 17/02 455/66.1 |
| 2011/0106911 A1 | 5/2011 | Sung et al. | |
| 2011/0188483 A1* | 8/2011 | Lee | H04M 1/7253 370/338 |
| 2012/0208466 A1* | 8/2012 | Park | G06F 1/1601 455/41.3 |
| 2012/0208514 A1* | 8/2012 | Park | G06F 3/0484 455/418 |
| 2012/0274863 A1* | 11/2012 | Chardon | G06F 17/30011 348/734 |
| 2013/0093713 A1* | 4/2013 | Bose | G01S 5/0072 345/174 |
| 2013/0217330 A1* | 8/2013 | Gardenfors | H04M 1/7253 455/41.2 |
| 2015/0072675 A1 | 3/2015 | Chang et al. | |

FOREIGN PATENT DOCUMENTS

| | | |
|---|---|---|
| EP | 2242240 A1 | 10/2010 |
| JP | 2004-192404 | 7/2004 |
| JP | 2005-031804 | 2/2005 |
| JP | 2005-044104 | 2/2005 |
| JP | 2006-185009 | 7/2006 |
| JP | 2006-319728 | 11/2006 |
| JP | 2010-049526 | 3/2010 |
| JP | 2010-262534 | 11/2010 |
| KR | 10-2005-0060783 | 6/2005 |
| KR | 100652957 B1 | 12/2006 |
| KR | 10-2008-0087997 | 10/2008 |
| KR | 20100135519 A | 12/2010 |
| KR | 20110047703 A | 5/2011 |
| WO | 2008/038634 A1 | 4/2008 |

OTHER PUBLICATIONS

Pogue, David. Windows 7: The missing manual (Chapter 15). Published Mar. 24, 2010. Electronic file retrieved from [safaribooksonline.com] on [May 14, 2017]. 11 pages.*

Rouse, Margaret. Definition: ripping (digital extraction). Entry posted at whatis.com. Last updated Mar. 2011. Retrieved from [http://whatis.techtarget.com/definition/ripping-digital-extraction] on [May 14, 2017]. 4 pages.*

Anonymous et al. How to Rip a DVD Using VLC Media Player.

(56) References Cited

OTHER PUBLICATIONS

Entry posted at wikihow.com. Last updated Jul. 2010. Retrieved from Internet Archive on [May 14, 2017]. 4 pages.*
International Search Report dated Dec. 3, 2012 in connection with International Patent Application No. PCT/KR2012/003668.
Written Opinion of the International Searching Authority dated Dec. 3, 2012 in connection with International Patent Application No. PCT/KR2012/003668.
Extended European Search Report dated Dec. 12, 2014 in connection with European Patent Application No. 12785685.4; 8 pages.
Notice of Preliminary Rejection dated May 16, 2016 in connection with Japanese Application No. 2014-510253, 7 pages.
Chinese Office Action and English translation issued for Chinese Application No. 2012800230835 dated Dec. 23, 2015, 29 pgs.
Notice of Preliminary Rejection dated Sep. 12, 2016 in connection with Japanese Application No. 2014-510253, 7 pages.
Second Office Action dated Aug. 18, 2016 in connection with Chinese Application No. 201280023083.5, 11 pages.
Foreign Communication from Related Counterpart Application; Japanese Patent Application No. 2014-510253; Japanese Notice of Patent Grant dated May 31, 2017; 5 pages.
Foreign Communication from Related Counterpart Application; Korean Patent Application No. 10-2011-0044866; Korean Office Action—Notice of Preliminary Rejection dated May 23, 2017; 12 pages.
Communication from a foreign patent office in a counterpart foreign application, European Patent Office, "Communication pursuant to Article 94(3) EPC," European Application No. EP 12 785 685.4, dated May 2, 2018, 9 pages.

* cited by examiner

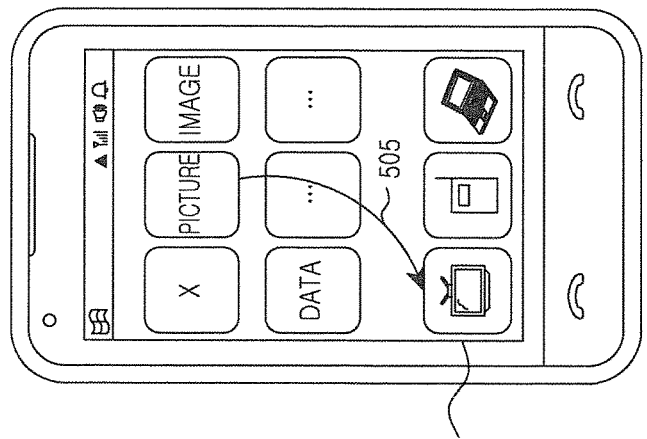
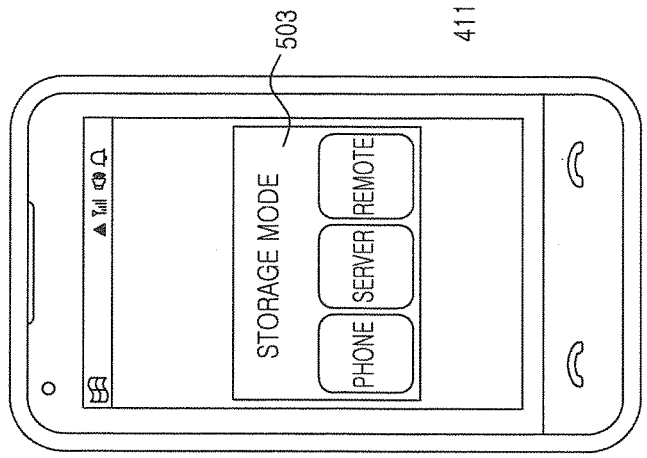
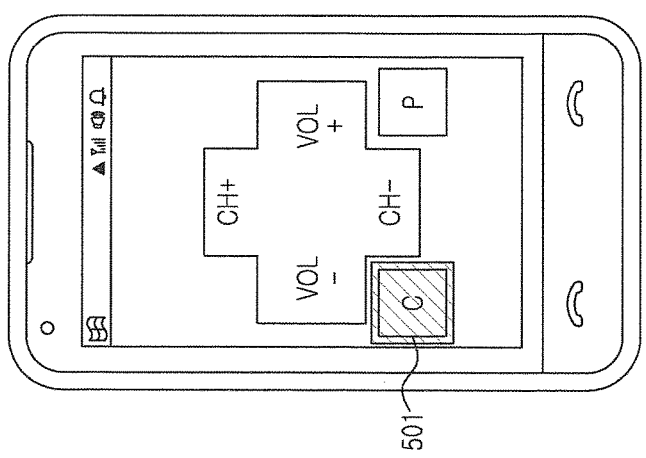
FIG.5A  FIG.5B  FIG.5C  FIG.5D  FIG.5E

APPARATUS AND METHOD FOR STORING DATA OF PERIPHERAL DEVICE IN PORTABLE TERMINAL

CROSS-REFERENCE TO RELATED APPLICATION(S) AND CLAIM OF PRIORITY

This application claims priority under 35 U.S.C. § 119 to an application filed in the Korean Intellectual Property Office on May 13, 2011, and assigned Serial No. 10-2011-0044866, the contents of which are incorporated herein by reference.

TECHNICAL FIELD OF THE INVENTION

The present disclosure relates generally to storing played data of a peripheral device in a portable terminal.

BACKGROUND OF THE INVENTION

Due to the recent rapid development of portable terminals, they are being widely used as necessary articles of modern persons without distinction of age and sex and are being used as media capable of wireless voice call and data exchange.

At the early distribution of portable terminals, they were simply recognized as being portable and providing a wireless call service. However, due to the development of technologies for portable terminals, service providers and terminal manufacturers are competitively developing products (or services) for differentiation from other competitors. For example, the portable terminals have evolved into multimedia devices to provide various services such as phone books, games, short messages, e-mails, wake-up calls, MP3, schedule managing functions, digital cameras, and wireless Internet services.

Recently, the portable terminal provides a function for sharing displayed data. That is, the portable terminal may connect with a device A to control the device A and display played data in a shared manner. Herein, the portable terminal may display a UI, corresponding to the device A, to control the device A. In addition, the portable terminal may transfer data, played in a connected device, to another device. For example, the portable terminal may transfer data, played in a home device, to an office device to play the data in the office device, so that a user may play the data regardless of place change and device change.

However, the above data transfer process may require a plurality of menu selection processes such as a data copy process, a peripheral device discovery process, and a data transmission process. Accordingly, a user unskilled in operating the portable terminal may avoid the use of the above function.

What is therefore required is an apparatus and method for simplifying the data transfer process to allow more users to conveniently play data regardless of place change and device change.

SUMMARY OF THE INVENTION

To address the above-discussed deficiencies of the prior art, it is an object to provide at least the advantages below. Accordingly, an object of the present disclosure is to provide an apparatus and method for storing data played in another device by a portable terminal.

Another object of the present disclosure is to provide an apparatus and method for providing a UI for simplifying the transmission of data played in another device by a portable terminal.

Another object of the present disclosure is to provide an apparatus and method for selecting data to be transferred and a device to receive the data, by a UI simplifying data transmission, in a portable terminal.

According to an aspect of the present disclosure, an apparatus for storing data of a peripheral device in a portable terminal includes: a UI managing unit for displaying, in the event of connection with a peripheral device, a UI for controlling data played in the peripheral device; and a data processing unit for copying the played data of the peripheral device through the UI and displaying a list of the copied data, wherein the data processing unit transmits data selected from the displayed list to another device.

According to another aspect of the present disclosure, a method for storing data of a peripheral device in a portable terminal includes: displaying, in the event of connection with a peripheral device, a UI for controlling data played in the peripheral device; copying the played data of the peripheral device through the UI; displaying a list of the copied data; and transmitting data selected from the displayed list to another device.

According to another aspect of the present disclosure, an apparatus for storing data of a peripheral device in a portable terminal includes: a control unit for transmitting data, played in a peripheral device, to another device by a UI for data transmission; a UI managing unit for displaying the UI for data transmission; a memory unit for storing information of the data to be transmitted to the other device; and an input unit for inputting data corresponding to the UI, wherein the UI managing unit displays at least one of a UI for copying the played data of the peripheral device, a UI for selecting a storage mode of the played data, a UI for representing an item of the stored data, and a UI for representing a list of devices to receive the copied data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A-E are diagrams illustrating a process for transferring data in a portable terminal according to an exemplary embodiment of the present disclosure;

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. Exemplary embodiments of the present disclosure will be described herein below with reference to the accompanying drawings. In the following description, detailed descriptions of well-known functions or configurations will be omitted since they would unnecessarily obscure the subject matter of the present disclosure.

The present disclosure provides an apparatus and method for playing data, played in a device connected to a portable terminal, in another device. The present disclosure provides an apparatus and method for providing a user interface (UI) for simplifying the transmission of data played in another device by a portable terminal. The data transmission is to transmit data, played in a connected device, from the portable terminal to another device in order to play the data in the other device. For example, pictures viewed at home may be copied and the copied pictures may be played in a friend's home television (TV). As another example, documents processed at home may be copied and the copied documents may continue to be processed in an office computer or may be printed by an office printer.

Figure 1:
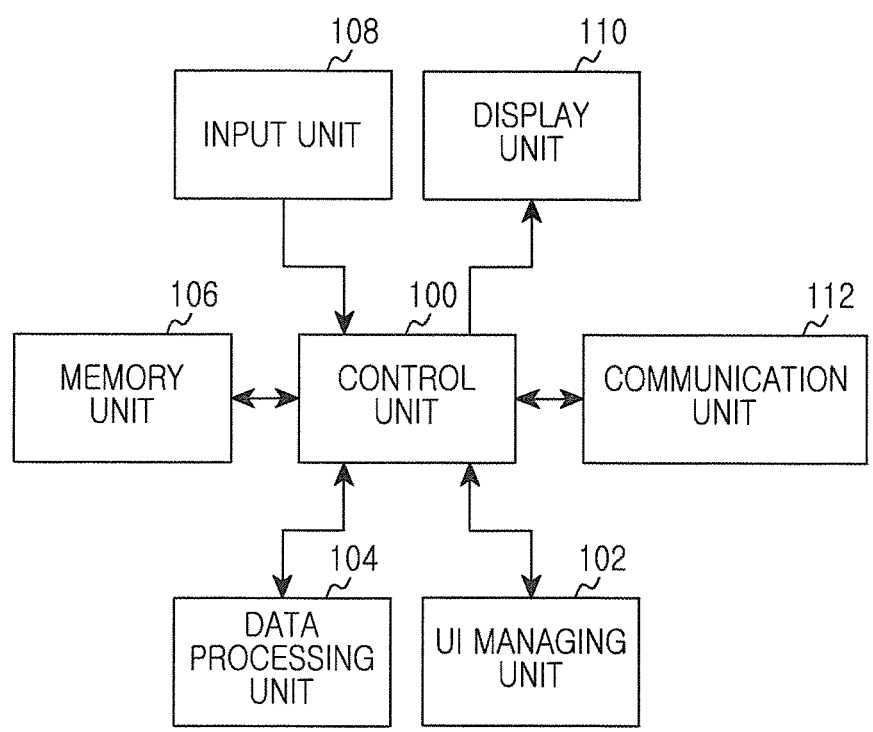
FIG. 1 is a block diagram of a portable terminal for data transfer according to an exemplary embodiment of the present disclosure.

FIG. 1 is a block diagram of a portable terminal for data transfer according, to an exemplary embodiment of the present disclosure. Referring to FIG. 1, the portable terminal may include a control unit 100, a UI managing unit 102, a data processing unit 104, a memory unit 106, an input unit 108, a display unit 110, and a communication unit 112.

The control unit 100 controls an overall operation of the portable terminal. For example, the control unit 100 processes and controls voice communication and data communication. In addition to the general functions, the method described herein of the present disclosure may be provided as one or more instructions in one or more software modules stored in the memory unit 106. The software modules may be executed by the control unit 100.

Also, according to the present disclosure, when transferring data played in a device to another device, the control unit 100 displays a UI for data transmission. Herein, the UI for data transmission may be a UI for controlling (e.g., copying and transferring) the played data. The UI for data transmission may include a data copy menu for selecting data to be played in another device and a data transfer menu for transferring prestored data to another device. For example, the menu for data transmission may be included in a dynamic UI capable of controlling a connected device. When connecting with a TV, the control unit 100 may include a menu for selecting and storing data played in the TV and a menu for transferring the stored data to another device in a dynamic UI corresponding to a TV remote control. Also, according to the selection of the menu included in the UI, the control unit 100 stores data played in a connected device or transfers prestored data to a peripheral device.

Under the control of the control unit 100, the UI managing unit 102 displays a UI for controlling data played in another device. Herein, the UI may include a UI including a storage mode of data played in a connected device, a UI representing an item of data to be transferred, and a UI including an item of a device to receive prestored data. If the UI managing unit 102 displays a dynamic UI for controlling a connected device, the UI managing unit 102 may additionally display a device control menu in the displayed dynamic UI.

The data processing unit 104 manages an item of data to be transferred. The data to be transferred may be stored in the portable terminal or in a specific server. In addition, the data may be directly transmitted from a device playing the data to another device. The data processing unit 104 provides the UI managing unit 102 with meta information about the data to be transferred. In addition, the data processing unit 104 transmits the data to another device or transmits the meta information to a peripheral device to request data reception.

The UI managing unit 102 and/or the data processing unit 104 may be referred to as another controller(s).

The memory unit 106 includes a ROM, a RAM and a flash ROM. The ROM stores various reference data and microcodes of programs for the process and control of the control unit 100, the UI managing unit 102, and the data processing unit 104.

The RAM is a working memory of the control unit 100, which stores temporary data that are generated during the execution of various programs. The flash ROM stores various updatable data such as phone book, outgoing messages, and incoming messages. In addition, according to the present disclosure, the memory unit 106 stores data to be transferred and meta information of data transmitted directly from a specific server or device.

The method executed by the UI managing unit 102 and/or the data processing unit 104 may be provided as one or more instructions in one or more software modules stored in the memory unit 106. In that case, the software modules may be executed by the control unit 100.

The input unit 108 includes numeric keys of digits 0-9 and a plurality of function keys, such as a Menu key, a Cancel (Delete) key, a Confirmation key, a Talk key, an End key, an Internet connection key, Navigation keys (or Direction keys), and character input keys. The input unit 108 provides the control unit 100 with key input data that corresponds to a key pressed by the user.

The display unit 110 displays characters, moving pictures, still pictures and status information generated during an operation of the portable terminal. The display unit 110 may be a color liquid crystal display (LCD) or an active-matrix organic light-emitting diode (AMOLED) display. If the display unit 110 has a touch input device and is applied to a touch input type portable terminal, it can be used as an input device. In addition, according to the present disclosure, the display unit 110 displays a UI including a data storage menu and a data transfer menu. A touch sensitive display, referred to as a touch screen, may be used as the display unit 110. In this situation, touch input may be performed via the touch sensitive display.

The communication unit 112 transmits/receives Radio Frequency (RF) signals inputted/outputted through an antenna (not illustrated). For example, in a transmitting (TX) mode, the communication unit 112 channel-encodes, spreads and RF-processes TX data prior to transmission. In a receiving (RX) mode, the communication unit 112 converts a received RF signal into a baseband signal and despreads and channel-decodes the baseband signal to restore the original data. According to the present disclosure, the communication unit 112 receives data to be transferred and meta information of the data and transmits a request for transmission of the data.

The above configurations should be considered in descriptive sense only and not for the purpose of limitation, and those skilled in the art will understand that various changes may be made therein without departing from the scope of the present disclosure. For example, although separate units, such as the UI managing unit 102 and the data processing unit 104, are provided for respective functions of the control unit 100, the control unit 100 may be configured to also perform all or some of the respective functions on behalf of such separate units.

Figure 2:
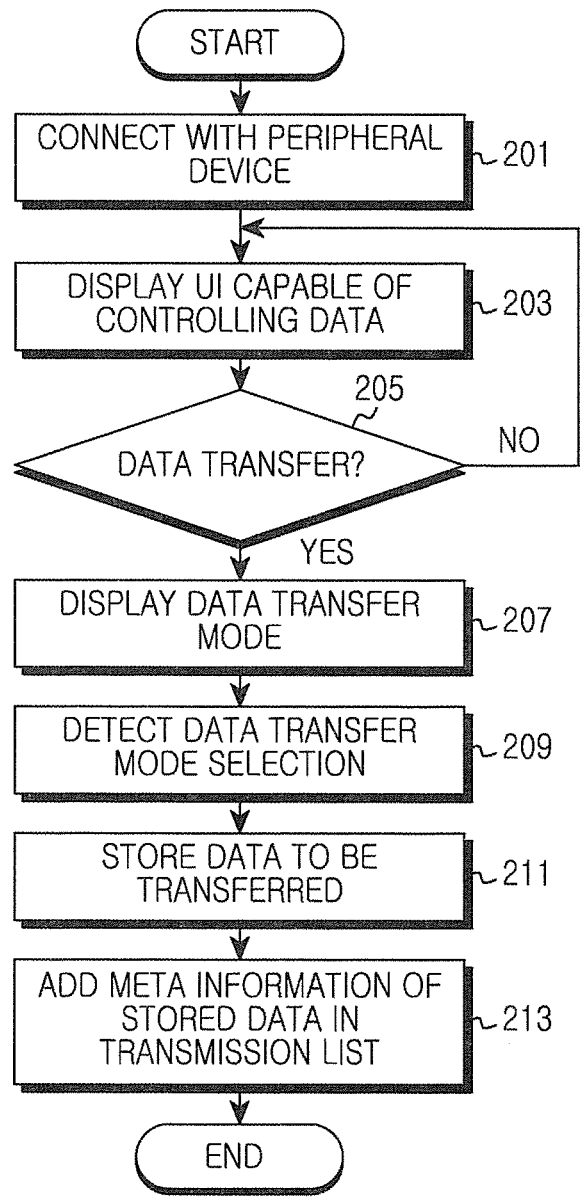
FIG. 2 is a flow diagram illustrating a process for storing data of a peripheral device in a portable terminal according to an exemplary embodiment of the present disclosure.

FIG. 2 is a flow diagram illustrating a process for storing data of a peripheral device in a portable terminal according to an exemplary embodiment of the present disclosure. Referring to FIG. 2, the portable terminal connects with a peripheral device in step 201. Herein, the portable terminal may connect with a peripheral device in order to share the playing of content data (e.g., music, picture and document data) by connecting with home devices such as notebook computers, TVs, and image play devices. For example, the portable terminal may connect with the peripheral device by DLNA (Digital Living Network Alliance) or UPnP (Universal Plug and Play).

In step 203, the portable terminal displays a UI for controlling data. Herein, the UI for controlling data may include a data copy menu for storing played data and playing the data in another device and a data transfer menu for transferring prestored data to another device. According to an exemplary embodiment, the portable terminal may include a UI for controlling the data in a dynamic UI for controlling a connected device (i.e., a UI varying according to a connected device). For example, when connected to a TV, the portable terminal may display a dynamic UI such as a remote control for controlling the TV. When connected to a notebook computer, the portable terminal may control the connected device by displaying a dynamic UI including a keyboard and a monitor screen. Herein, the dynamic UI may further include a menu for storing played data and playing the data in another device and a menu for transferring prestored data to another device.

In step 205, the portable terminal determines whether a data transfer request is generated. Herein, the data transfer is a process for transferring data played in a connected device to another device in order to play the data in the other device. For example, the data transfer request may be determined by detecting an input of a menu for storing played data and playing the data in another device. If a data transfer request is not generated (in step 205), that is, if the portable terminal is to continue playing the data in the connected device, the portable terminal returns to step 203.

On the other hand, if a data transfer request is generated (in step 205), that is, if the portable terminal is to stop playing the data in the connected device and play the data in another device, the portable terminal proceeds to step 207. In step 207, the portable terminal displays a UI including a data transfer mode. Herein, the data transfer mode relates to the storage location of the data to be transferred. For example, the data transfer mode may be stored in the portable terminal or a server. In addition, the portable terminal may provide the data through a remote control from a connected device to another device to play the data.

In step 209, the portable terminal detects a data transfer mode selected by a user. In step 211, the portable terminal stores the data to be transferred according to the data transfer mode selected by the user. Herein, if data are to be transferred to a specific server, the portable terminal transmits the data to the server to perform a data storage process. If data are to be transmitted directly from a device, the portable terminal stores the data therein and transmits the stored data to another device when a data transmission request is generated.

In step 213, the portable terminal obtains meta information of the data to be transmitted directly from a specific server or device and adds the obtained meta information in a transmission list. If the data are stored in the portable terminal, the meta information may include the file name of the data and the storage location of the data in the portable terminal. If the data are stored in the server, the meta information may include the password, the connection identification (ID) and the Internet address of the data stored in the server. If the data are provided directly from the connected device, the meta information may include the data ID, the device ID of the connected device, the password, the connection ID and the Internet address of the server controlling the connected device.

The transmission list is a list of data to be transferred to another device. For example, the transmission list may be a list of data stored in the portable terminal or the server and data to be transmitted directly from the device. Thereafter, the portable terminal ends the present algorithm.

Figure 3:
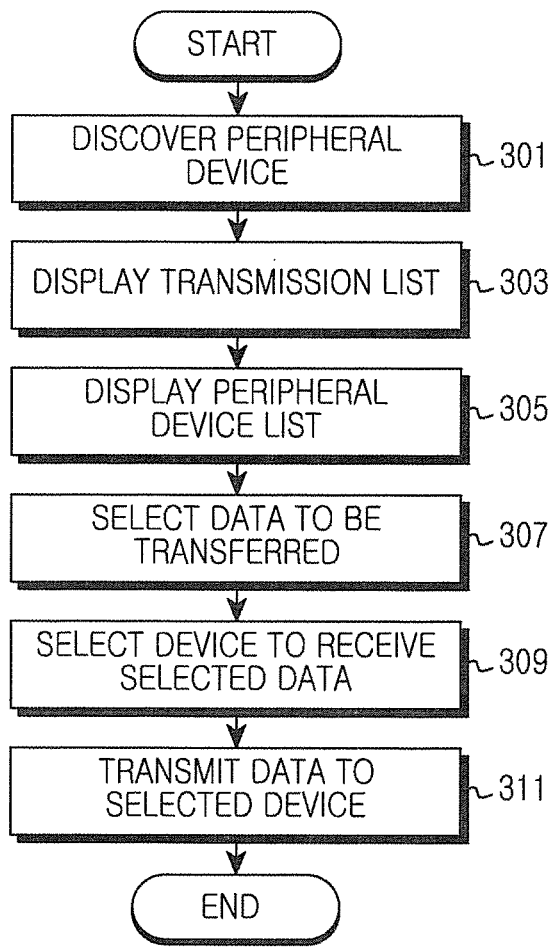
FIG. 3 is a flow diagram illustrating a process for transferring data in a portable terminal according to an exemplary embodiment of the present disclosure.

FIG. 3 is a flow diagram illustrating a process for transferring data in a portable terminal according to an exemplary embodiment of the present disclosure. Referring to FIG. 3, the data transfer process may be started when a data transfer menu for transferring prestored data to another device is inputted.

In step 301, the portable terminal discovers peripheral devices. In step 303, the portable terminal displays a transmission list. Herein, the transmission list is a list of data to be transferred to another device. For example, the transmission list may be a list of data stored in the portable terminal or the server and data to be transmitted directly from the device.

In step 305, the portable terminal displays a list of the peripheral devices discovered in step 301. Herein, the portable terminal may display an icon of data to be transferred and an icon of another device to receive the data on a screen picture so that a user may easily select the data to be transferred and the device to receive the data.

Thereafter, in step 307, the portable terminal receives a selection of data to be transferred. In step 309, the portable terminal receives a selection of a device to receive the selected data. According to an exemplary embodiment, the user of the portable terminal may perform the above operation by selecting data to be transferred and dragging the selected data to a device to receive the selected data or by selecting data to be transferred and selecting a displayed item of a target device to receive the selected data.

In step 311, the portable terminal transmits the selected data to the selected device. Herein, according to a data transfer mode of the data to be transferred, the portable terminal may transmit the selected data directly or through the server. In addition, the portable terminal may transmit the selected data to the selected device through a remote control function, and the data transfer mode may be displayed after the selection of the data to be transferred. Thereafter, the portable terminal ends the present algorithm.

Figure 4A:
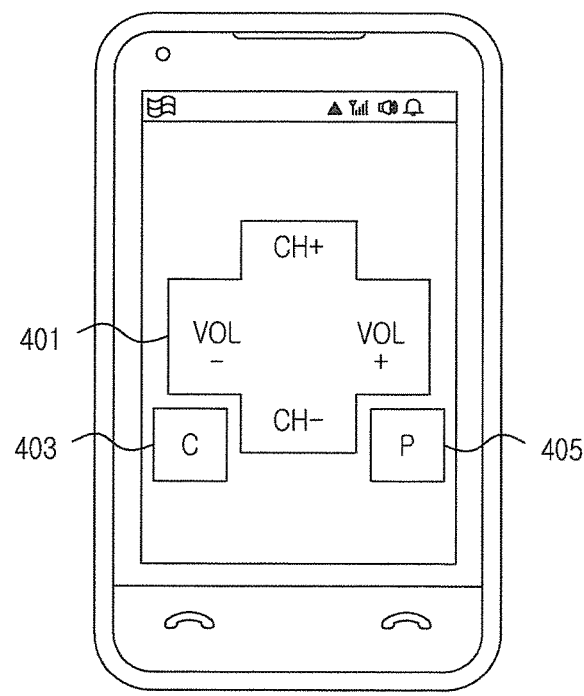
FIGS. 4A-D are diagrams illustrating a UI of a portable terminal for data transfer according to an exemplary embodiment of the present disclosure.

FIGS. 4A-D are diagrams illustrating a UI of a portable terminal for data transfer according to an exemplary embodiment of the present disclosure. Referring to FIG. 4A, when connecting with a peripheral device for data sharing, the portable terminal displays a UI. Herein, the UI may include a menu 403 for storing played data and playing the data in another device and a menu 405 for transferring prestored data to another device. In addition, the UI may also include a button 401 for controlling the connected device. For example, when connecting with a TV, the portable terminal may display a remote control UI for controlling the TV, which includes a menu 403 for storing played data and playing the data in another device and a menu 405 for transferring prestored data to another device.

Figure 4B:
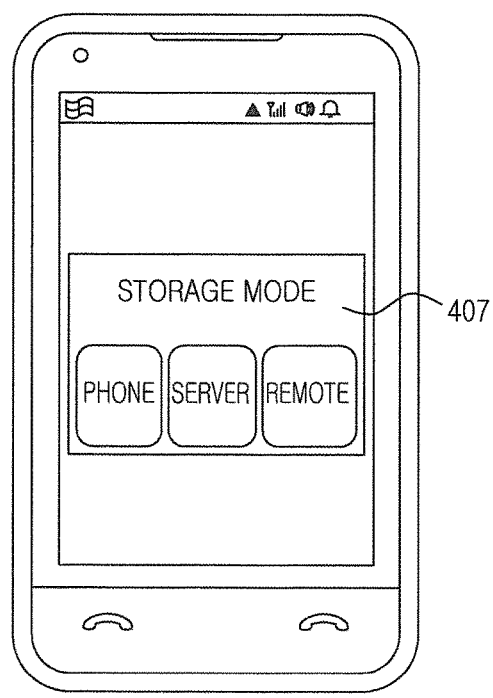

Also, the portable terminal displays a UI for selecting a storage mode 407 to transfer data played in a connected device, as illustrated in FIG. 4B. The storage mode 407 may include a mode of storing the data in the portable terminal, a mode of storing the data in a specific server, and a mode of transmitting the data directly through a remote control.

The mode of storing the data in the portable terminal is used to transfer small-sized data. This storage mode stores the data in the portable terminal and transmits the stored data to a peripheral device. For example, the storage mode may be used to transfer a captured image and document (text) data.

The mode of storing the data in a specific server is used to transfer large-sized data. This storage mode stores the data in a specific server instead of storing the data in the portable terminal. That is, the portable terminal provides meta information of data stored in a specific server, discovers a device to receive the data, and transmits the data through the server to the discovered device. For example, the storage mode may be used to transfer streaming data and image data.

Figure 4C:
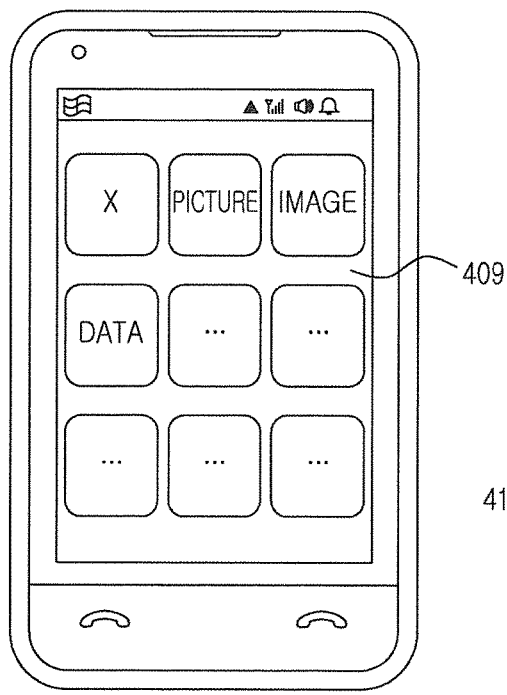

The mode of transmitting the data directly through a remote control is used to directly transmit the data from the connected device to another device to be connected to the portable terminal. Also, the portable terminal provides an item 409 of the data to be transferred (i.e., the data stored through the above UI), through a UI as illustrated in FIG. 4C.

Figure 4D:
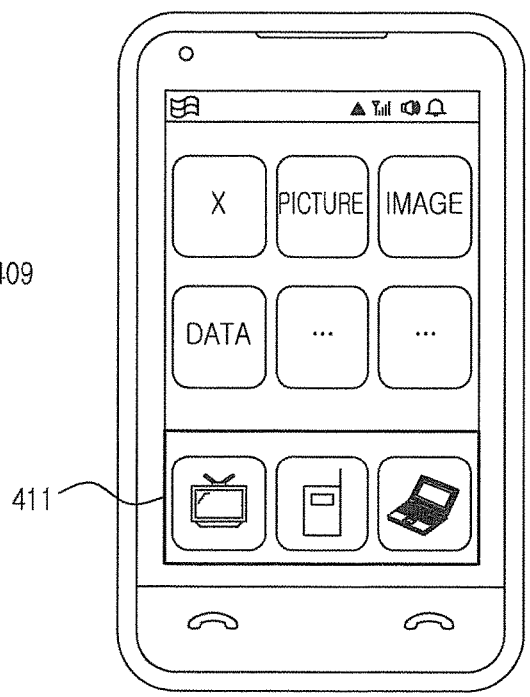

When detecting a selection of the data storage mode, the portable terminal receives meta information of the stored data from the connected device and adds the meta information to an item of the data to be transferred. FIG. 4C illustrates the portable terminal stores picture, image and text data in order to transfer the same. Also, the portable terminal provides a list 411 of devices to receive the prestored data, through a UI as illustrated in FIG. 4D. That is, the portable terminal stores the data, discovers a peripheral device, and displays the discovery result in the form of an icon. At this point, the portable terminal may also display an icon of the item of the prestored data and an icon of the item of the discovered peripheral device.

FIGS. 5A-E are diagrams illustrating a process for transferring data in a portable terminal according to an exemplary embodiment of the present disclosure. The portable terminal connects with a TV 500 playing image data as illustrated in FIG. 5A and displays a UI for controlling the played data as illustrated in FIG. 5B

The UI displayed by the portable terminal may be a UI for controlling the connected TV. The displayed UI may vary according to the type of a device connected to the portable terminal. The displayed UI may include a menu for storing played data and playing the data in another device and a menu for transferring prestored data to another device. That is, the displayed UI may include a data copy menu for storing played data and playing the data in another device and a data transfer menu for transferring prestored data to another device.

If a user of the portable terminal desires to share a specific screen picture with another user while watching the TV, the user of the portable terminal stores captured screen data in the portable terminal. In this case, the portable terminal may store the captured screen data by receiving an input of a menu 501 of the displayed UI for playing the captured data in another device.

When detecting the menu input for playing the captured screen data in another device, the portable terminal displays a menu 503 for selecting a storage mode of data to be transferred, as illustrated in FIG. 5C. The data storage mode may include a mode of storing the data in the portable terminal, a mode of storing the data in a specific server, and a mode of transmitting the data directly through a remote control.

The mode of storing the data in the portable terminal is used to transfer small-sized data. This storage mode stores the data in the portable terminal and transmits the stored data to a peripheral device. For example, the storage mode may be used to transfer a captured image and document (text) data.

The mode of storing the data in a specific server is used to transfer large-sized data. According to this storage mode, the portable terminal provides meta information of data stored in a specific server, discovers a device to receive the data, and transmits the data through the server to the discovered device. For example, the storage mode may be used to transfer streaming data and image data.

The mode of transmitting the data directly through a remote control is used to directly transmit the data from the connected device to another device to be connected to the portable terminal.

When the user selects a data storage mode, the portable terminal receives meta information of the stored data from the connected device and adds the meta information to an item of the data to be transferred, as illustrated in FIG. 5D. Items illustrated in FIG. 5D are items of data to be transferred by the user to another device. In order to transfer the stored data, the portable terminal discovers peripheral devices and displays a list of the discovered devices in a portion of the items of the data to be transferred. This is to allow the user of the portable terminal to conveniently select data to be transferred and a device to receive the selected data.

As illustrated in FIG. 5D, the user of the portable terminal may transmit the selected data by dragging and dropping the selected data to the selected device on the displayed screen. The drag-and-drop operation relates to a data transfer request according to an exemplary embodiment of the present disclosure. When data to be transferred are selected, the data transfer request may be selected by outputting a list of peripheral devices to receive the selected data. Accordingly, another TV receives the data and plays the received data 507 as illustrated in FIG. 5E.

Figure 6:
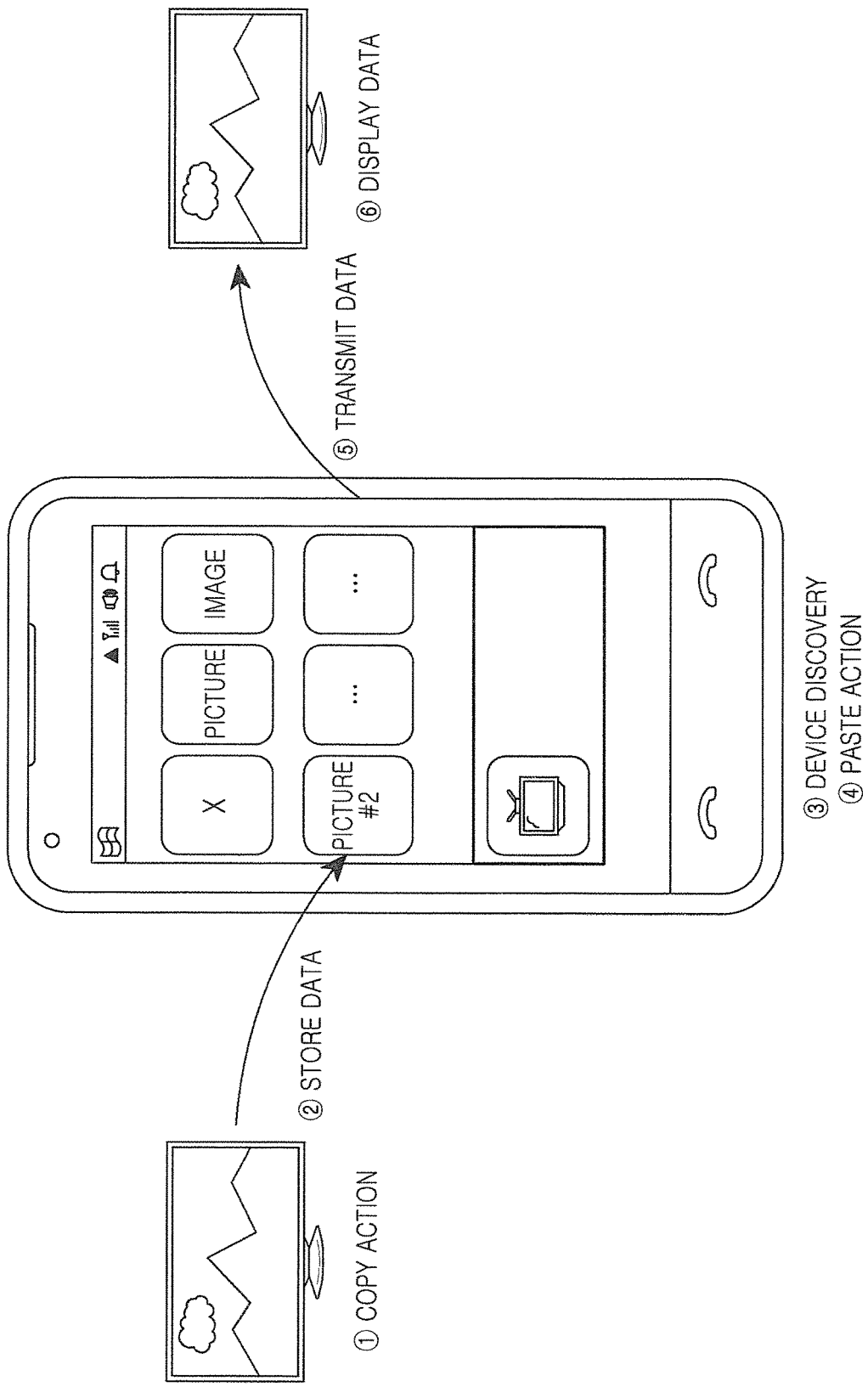
FIG. 6 is a diagram illustrating a process for transferring data in a portable terminal according to an exemplary embodiment of the present disclosure.

FIG. 6 is a diagram illustrating a process for transferring data in a portable terminal according to an exemplary embodiment of the present disclosure. Referring to FIG. 6, the portable terminal stores data played in a connected device in the portable terminal itself and transmits the stored data to another device. First, the portable terminal detects a user's input for data copy while connecting with a TV (1). Thereafter, the portable terminal receives copied data (e.g., captured screen data) from the TV and stores the data (2). Thereafter, the portable terminal discovers peripheral devices (3). Upon receiving and storing the copied data, the portable terminal displays an item of the stored data and an item of the discovered peripheral device.

Thereafter, when an item of data to be transferred and an item of a device to receive the data are selected (4), the portable terminal detects the type of data to be transferred and the type of a device to receive the data. Thereafter, the portable terminal transmits the selected data to the selected device (5). Accordingly, the selected device receives and plays the selected data (6).

Figure 7:
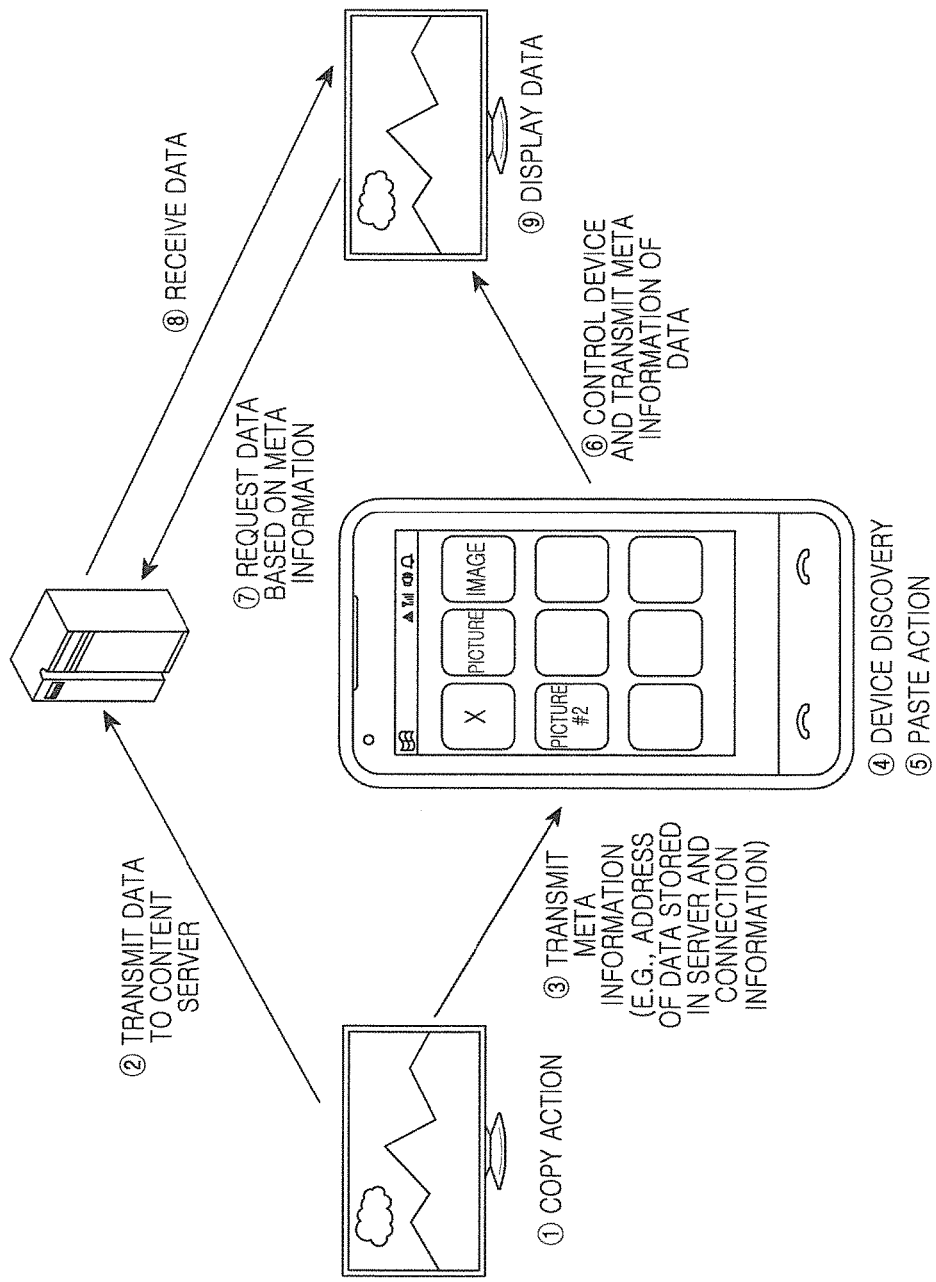
FIG. 7 is a diagram illustrating a process for transferring data in a portable terminal according to another exemplary embodiment of the present disclosure.

FIG. 7 is a diagram illustrating a process for transferring data in a portable terminal according to another exemplary embodiment of the present disclosure. Referring to FIG. 7, the portable terminal detects a user's input for data copy while connecting with a TV (1). Accordingly, the device (TV) connected to the portable terminal transmits data to be copied to a specific server (2).

Thereafter, the portable terminal receives and stores meta information (e.g., the connection information and the address of data stored in the server) of the data (e.g., captured screen data) transmitted (copied) to the server by the TV (3). Thereafter, the portable terminal discovers peripheral devices (4). Upon receiving the meta information, the portable terminal displays an item of the data stored in the server and an item of the discovered peripheral device.

Thereafter, when an item of data to be transferred and an item of a device to receive the selected data are selected (5), the portable terminal transmits meta information of the data stored in the server to the device to receive the selected data (6). Upon receiving the meta information, the device transmits a data request to the server (7). Herein, the device may transmit the data request on the basis of the meta information received from the portable terminal. Upon receiving the data request, the server transmits the selected data to the device. The device receives the selected data from the server (8) and displays the received data (9). When the data to be transferred are transferred by a drag-and-drop operation to the discovered device, the portable terminal may determine that data to be transferred and a device to receive the data have been selected.

Figure 8:
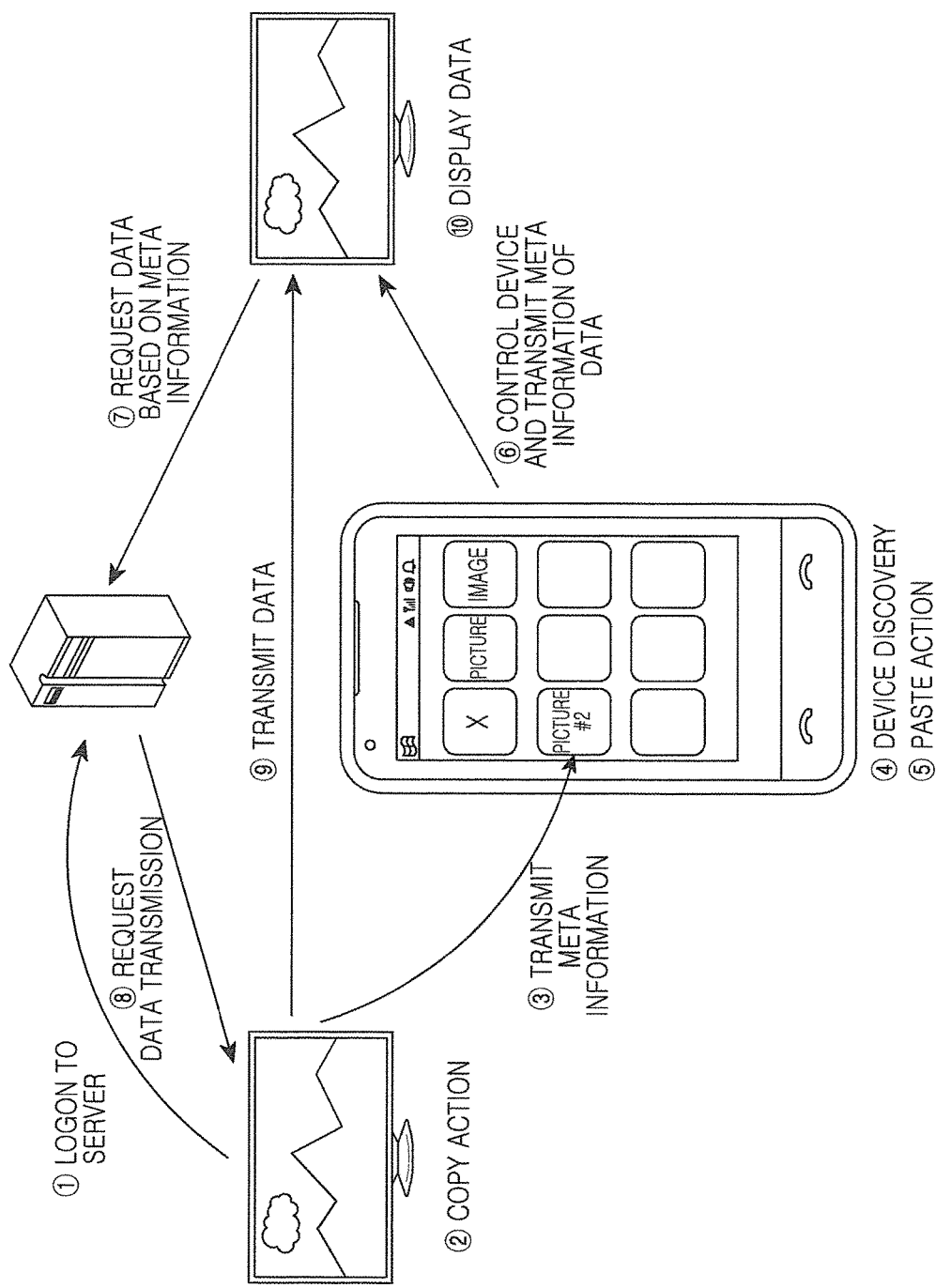
FIG. 8 is a diagram illustrating a process for transferring data in a portable terminal according to another exemplary embodiment of the present disclosure.

FIG. 8 is a diagram illustrating a process for transferring data in a portable terminal according to another exemplary embodiment of the present disclosure. Referring to FIG. 8, the portable terminal directly transmits data played in a connected device to another device. First, a TV connects with a server and performs registration (1).

Thereafter, the portable terminal detects a user's input for data copy while connecting with the TV (2). Thereafter, the portable terminal receives and stores meta information of data (e.g., captured screen data) copied from the TV (3). Thereafter, the portable terminal discovers peripheral devices (4). Upon receiving the meta information, the portable terminal displays an item of the data to be transmitted to another device and an item of the discovered peripheral device. Herein, the portable terminal receives meta information through the TV in order to provide information of data to be transmitted to another device.

Thereafter, when an item of data to be transferred and an item of a device to receive the selected data are selected (5), the portable terminal transmits meta information of the selected data to the other device (6). Upon receiving the meta information, the other device transmits a data request to the server on the basis of the received meta information (7). Upon receiving the data request, the server transmits a data transmission request to the TV connected to the portable terminal (8). At this point, the server provides the TV with information about the device to receive the selected data. Upon receiving the data transmission request, the TV transmits the selected data to the device (9). Accordingly, the device receives the selected data and displays the received data (10).

As described above, the present disclosure provides a UI for simplifying the transmission of data played in another device by a portable terminal. Accordingly, the user can easily detect an item of data to be transferred and an item of a peripheral device to receive the data and can simply select data to be transferred and a device to receive the data.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing an apparatus or a method as claimed in any one of the claims of this specification and a machine-readable storage storing such a program. Still further, such programs may be conveyed electronically via any medium, such as a communication signal carried over a wired or wireless connection, and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A portable terminal, comprising:
a display;
a communication interface;
a memory; and a hardware controller configured to:
- control the communication interface to connect with a first device,
- control the display to display a user interface to control data stored in the first device,
- responsive to receiving an input through the user interface, select a storage mode of the data in the first device,
- control the communication interface to receive at least one of the data or meta information of the data from the first device based on the selected storage mode while the first device plays back the data on a display of the first device, control the memory to store the at least one of received data or meta information of the data,
- control the display to display an item of the data or meta information of the data and at least one peripheral device,
- receive a selection of a second device, among the at least one peripheral device, and the item, and
- control the communication interface to transmit, in response to the received selection, the at least one of selected data or meta information of the selected data to the second device based on the selected storage mode, wherein the storage mode comprises at least one of a first mode of storing the data in the memory, a second mode of storing the data in a server, or a third mode of transmitting the data from the first device to the second device.

2. The portable terminal of claim 1, wherein the meta information includes at least one of a storage location and a file name of the data,
wherein if the second mode is selected, the meta information further includes at least one of a password of the data stored in the server, a connection identification (ID) of the data stored in the server, and an Internet address of the data stored in the server, and
wherein if the third mode is selected, the meta information further includes at least one of a data ID, a device ID of the first device, a password of a second server controlling the first device, a connection ID of the second server, and an Internet address of the second server.

3. The portable terminal of claim 1, wherein a dragging and dropping gesture is used to select the second device and the item of the data.

4. The portable terminal of claim 1, wherein the hardware controller is further configured to, after transmission and responsive to receiving an input in the user interface, control the second device to play the stored data and control the first device to stop playing the data.

5. A method of a portable terminal, comprising:
- connecting with a first device;
- displaying a user interface to control data stored in the first device;
- responsive to receiving an input through the user interface, selecting a storage mode of the data in the first device;
- receiving at least one of the data or meta information of the data from the first device based on the selected storage mode while the first device plays back the data on a display of the first device;
- storing the at least one of received data or meta information of the data in the portable terminal;
- displaying an item of the data or meta information of the data and at least one peripheral device;
- receiving a selection of a second device, among the at least one peripheral device, and the item; and
- transmitting, in response to the received selection, the at least one of selected data or meta information of the selected data to the second device based on the selected storage mode,
wherein the storage mode includes at least one of a first mode of storing the data in the portable terminal, a second mode of storing the data in a server, and a third mode of transmitting the data from the first device to the second device.

6. The method of claim 5, wherein the meta information includes at least one of a storage location and a file name of the data,
wherein if the second mode is selected, the meta information further includes at least one of a password of the data stored in the server, a connection identification (ID) of the data stored in the server, and an Internet address of the data stored in the server, and
wherein if the third mode is selected, the meta information further includes at least one of a data ID, a device ID of the first device, a password of a second server controlling the first device, a connection ID of the second server, and an Internet address of the second server.

7. A machine-readable storage medium recording program instructions, the program instructions executable by a processor to:
- connect with a first device;
- display a user interface to control data stored in the first device;
- responsive to receiving an input through the user interface, selecting a storage mode of the data in the first device;
- receive at least one of the data or meta information of the data from the first device based on the selected storage mode while the first device plays back the data on a display of the first device;
- store the at least one of received data or meta information of the data in a memory;
- display an item of the data or meta information of the data and at least one peripheral device;
- receive a selection of a second device, among the at least one peripheral device, and the item; and
- transmit, in response to the received selection, the at least one of selected data or meta information of the selected data to the second device based on the selected storage mode,
wherein the storage mode includes at least one of a first mode of storing the data in a portable terminal, a second mode of storing the data in a server, and a third mode of transmitting the data from the first device to the second device.

* * * * *